United States Patent [19]
Brooks

[11] Patent Number: 4,812,072
[45] Date of Patent: Mar. 14, 1989

[54] TORSION STRUCTURAL PIVOT

[75] Inventor: John J. Brooks, Santa Ynez, Calif.

[73] Assignee: Santa Barbara Research Center, Goleta, Calif.

[21] Appl. No.: 166,854

[22] Filed: Mar. 11, 1988

[51] Int. Cl.4 ............................................. F16D 1/00
[52] U.S. Cl. ...................................... 403/24; 403/291; 464/100; 74/5 F
[58] Field of Search ................... 403/291, 24; 267/160; 464/100, 160; 74/5 F

[56] References Cited

U.S. PATENT DOCUMENTS

| 2,909,064 | 10/1959 | Schoeppel et al. | 267/160 |
| 2,984,996 | 5/1961 | Ormond | 267/160 |
| 2,992,047 | 7/1961 | Ecker | 403/291 |

Primary Examiner—Andrew V. Kundrat
Attorney, Agent, or Firm—W. C. Schubert; V. G. Laslo; A. W. Karambelas

[57] ABSTRACT

A structural pivot 10 includes a first end cap 18 and a second end cap 20 which are connected together by an elastic member 22 in the form of a cruciform. The structural pivot 10 does not exhibit a geometric center shift when one of the end caps is angularly deflected.

9 Claims, 1 Drawing Sheet

TORSION STRUCTURAL PIVOT

BACKGROUND

1. Technical Field

This invention relates to joints for rotating members and, more particularly, structural pivots.

2. Discussion

Structural pivots are often used to overcome many of the disadvantages associated with other types of rotating joints such as knife edges, bearings, ball and socket joints and the like. Among the advantages of structural pivots is the elimination of friction, backlash, wear, the lack of requirement for lubrication, insensitivity to contamination, and the ability to operate over a wide range of environmental conditions. Structural pivots can be used in a wide variety of applications such as in gimbal ring mounts, pressure transducers, throttle linkages and automatic bag fillers. They are also finding increasing application in optical systems for mounting rotating mirrors and the like.

One of the best known commercially available structural pivots is the "Free-Flex" pivot marketed by the Electric and Fluid Power Division of The Bendix Corporation. The construction of the Free-Flex pivot is described in the trade literature and in a paper by Troeger, "Considerations in the Application of Flexural Pivots", Automatic Control Data Systems Engineering, Volume 17, No. 4, November, 1962. Despite its several advantages, the Free-Flex design also has its share of disadvantages. One particular drawback is that the geometric center of its rotating member will shift as the member is angularly deflected. As a result, its use in several applications like the above-mentioned precision optical systems is limited unless special precautions are taken. In addition, it would be desirable to improve the lifetime and reliability characteristics of this known design.

SUMMARY OF THE INVENTION

Pursuant to the present invention, a torsion pivot is provided that substantially eliminates the geometric center shift of its rotating members. Both of the rotating members are in the form of a cylindrical end cap each having an outer face extending transverse to the major axes of the caps. An elastic element is figured in the shape of a cruciform with four blades meeting at a central axis and radially extending therefrom. Means are provided for connecting opposite longitudinal edges of the cruciform to the end caps so that the central axis of the cruciform is collinear with the major axes of the end caps.

BRIEF DESCRIPTION OF THE DRAWINGS

The various advantages of the present invention will become apparent to those skilled in the art upon reading the following specification and by reference to the drawings in which.

DESCRIPTION OF THE PREFERRED EMBODIMENT

Figure 1:
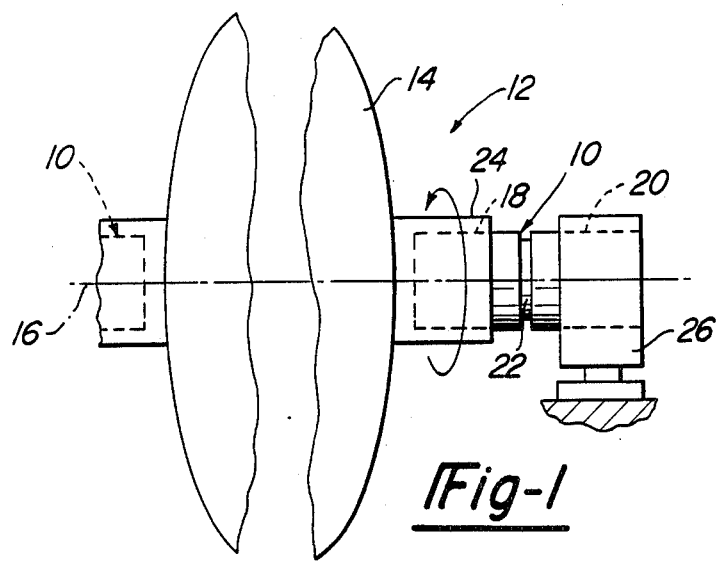
FIG. 1 is an environmental view showing a torsion pivot made in accordance with the teachings of this invention, the pivot being mounted to an oscillating mirror in an optical system.

With reference now to the drawings, the torsion pivot 10 of the preferred embodiment of this invention is show in FIG. 1 as being used in conjunction with optical system 12 employing a rotating mirror 14. In practice, two torsion pivots 10 (as illustrated) are often employed on opposite sides of a pivot axis 16 for the mirror 14 as shown.

The pivot 10 includes three main parts: an end cap 18, a substantially identical end cap 20 and an elastic member 22. Although the pivot 10 can be mounted in a variety of manners, it is shown being mounted to mirror 14 by having end cap 18 fixed to a mirror receptacle 24 while the end cap 20 is connected to a rigid mount 26.

As noted before, each end cap is substantially identical. They are cylindrical in shape having open ends 28, 30 and closed outer faces 32, 34, respectively. In a particularly useful embodiment, the end caps are approximately 0.75 inch in diameter, with a wall thickness of approximately 0.040 inch. However, the pivot construction can be made in a variety of different sizes.

Figure 3:
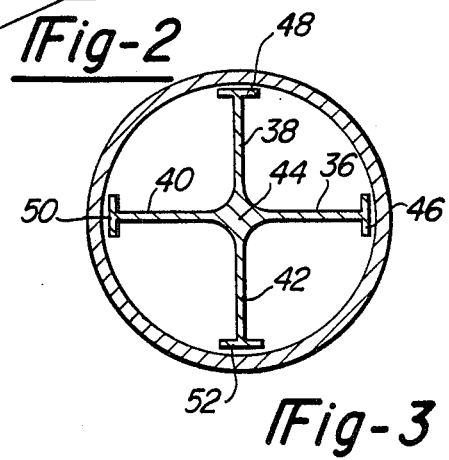
FIG. 3 is a transverse cross sectional view of the pivot.

The elastic element 22 is figured as a cruciform which is defined by an equal number of radially extending blades, preferably four in number which bear reference numerals 36-42, although more than four can be used. The inner ends of the blades are joined at a central axis 44. As can be seen most clearly in FIG. 3, each of the blades terminates in a transversely extending flange 46-52. Each flange runs substantially the length of its associated blade, yet is spaced from the outer longitudinal edges of the blades. The distance between the outer longitudinal edge of the blade and the outer end of its associated flange is slightly more than the thickness of the end cap face. The distance between the central axis 44 of the cruciform and each of the flanges 46-52 is less than the distance between the center of each end cap and the inner wall thereof. Accordingly, the flanges 46-52 remain spaced from the inner walls of the end caps when the pivot is assembled.

Figure 2:
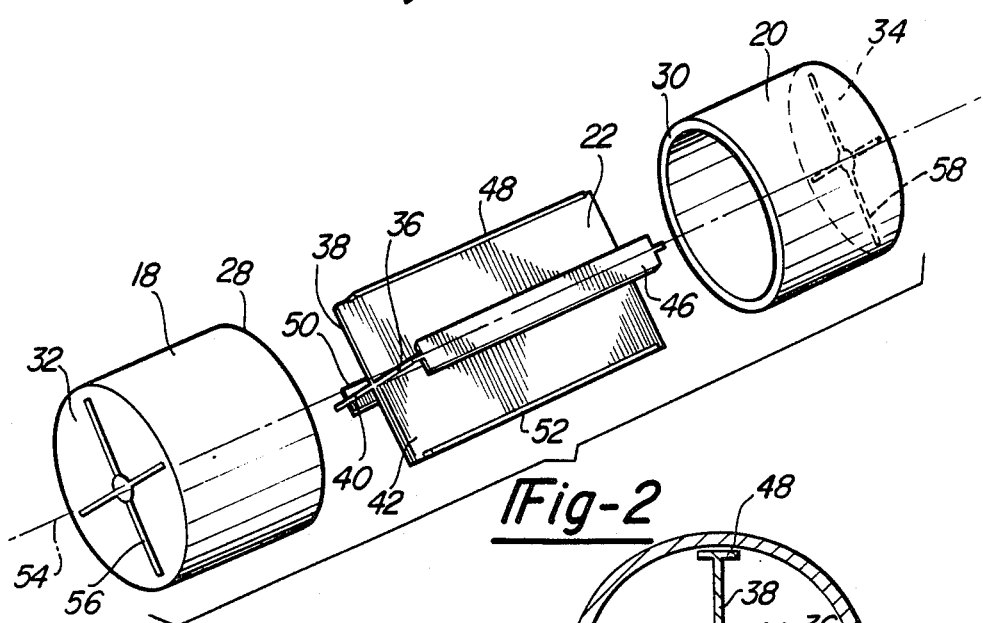
FIG. 2 is an exploded perspective view of the torsion pivot.
Figure 4:
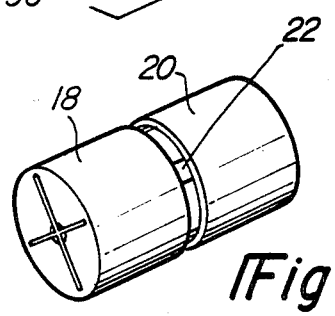
FIG. 4 is a perspective view of the assembled pivot.

Provision is made for connecting opposite longitudinal edges of the elastic member 22 to the end caps 32 and 34 so that the central axis 44 of the cruciform is collinear with the major axes of the end caps, the latter common axis being labeled with reference number 54 in FIG. 2. To this end, X-shaped slots 56 and 58 are formed in the end faces of caps 18 and 20. With reference to the orientation of the parts in the drawings, the left hand longitudinal edge of elastic member 22 fits within the slot 56 in end cap 18. Likewise, the right hand longitudinal edge of elastic member 22 fits within the slot 58 in end cap 20. A rigid connection is made therebetween such as by welding the edges of the elastic member 22 to their respective caps.

When assembled, the flanges 46-52 of member 22 remain spaced from the inner walls of the end caps both longitudinally and transversely. As a result, the flexibility of the pivot is increased without unduly decreasing bending stiffness or buckling strength. The cruciform shape of the elastic member 24, with or without flanges, is flexible in torsion but stiff in bendig and strong in bending and shear. This shape also has the advantage in that it can be machined with a milling cutter out of one piece of material. In the preferred embodiment, all of the components are made of stainless steel, titanium, or other suitable material.

An important aspect of the present invention is that the pivot 10 exhibits no geometric shift of the axis of rotation when either of the rotating members, i.e. end caps 18 or 20 are angularly deflected. Accordingly, the torsion pivot 10 finds particular utility in those applications, such as in the optical system described in connection with FIG. 1, where it is desirable to minimize this geometric shift that has been a disadvantage in the known prior art designs. In addition, the present invention is optimized for large torsional compliance and high lateral stiffness and strength. All of these advantages are achieved with a comparatively simple construction. Various other advantages will become apparent to those skilled in the art after having the benefit of studying the specification, drawings and following claims.

What is claimed is:

1. A structural pivot that substantially eliminates the geometric center shift of its rotating members, said pivot comprising:

a first end cap having an outer face extending transversely to the major axis of the cap;

an elastic element having at least three equally spaced blades meeting at a central axis and radially extending therefrom, the lateral ends of each blade including a transversely extending flange, said flanges being spaced from inner walls of the end caps; and mounting means for connecting opposite longitudinal edges of the blades to the end caps so that the central axis is collinear with the major axis of the end caps.

2. The pivot of claim 1 wherein said end caps are cylindrical.

3. The pivot of claim 1 wherein said elastic member is formed of an integral piece of metal.

4. The pivot of claim 1 wherein said elastic member is configured as a cruciform with four blades meeting at a central axis and radially extending therefrom.

5. The pivot of claim 4 wherei said mounting means includes slots formed in each end cap for receiving the longitudinal edges of the cruciform.

6. The pivot of claim 5 wherein said edges of the cruciform are electron beam welded in the slots.

7. An optical system comprising:

a rotating mirror;

a torsion pivot including a first cylindrical end cap having an outer face extending transversely to the major axis of the cap; a second end cap having an outer face extending transversely to the major axis of the cap, an elastic element configured as a cruciform with four blades meeting at a central axis and radially extending therefrom, lateral edges of the blades including flanges longitudinally extending thereon; mounting means for connecting opposite longitudinal edges of the cruciform to the end caps so that the central axis of the cruciform is collinear with the major axes of the end caps;

means for connecting one of the end caps to the mirror; and means for connecting the other end cap to a fixed support; and whereby said first end cap rotates with the mirror without creating a geometric center shift therein.

8. The system of claim 7 wherein said mounting means comprises X-shaped slots in each end cap for receiving opposite longitudinal edges of the cruciform.

9. The system of claim 8 wherein said flanges are spaced from inner walls of the end caps.

* * * * *